Patented July 19, 1949

2,476,609

UNITED STATES PATENT OFFICE 2,476,609

MANUFACTURE OF CONDENSATION PRODUCTS

Louis L. Lerner, Chicago, Ill., assignor to Consolidated Royal Chemical Corporation, Chicago, Ill., a corporation of Delaware No Drawing. Application February 20, 1946, Serial No. 649,132

7 Claims. (Cl. 260—398)

The present invention relates generally to the production of condensation reaction products, of the kind disclosed in my prior co-pending application Serial No. 557,945, filed October 9, 1944, now Patent No. 2,437,261, issued March 9, 1948.

In said application I have described the condensation of an ester with polyethylene glycols, eliminating water between them, and forming new compounds, varying in properties depending upon the relative proportions of ester and of glycol, and also upon the extent to which condensation is permitted. Said application discloses the condensation of 2 moles of an ester with 2 to 4 moles of the glycol, and the elimination by such condensations of from 2 to 8 moles of water. The compounds formed may be cross-chains, or cyclic compounds, or various complex combinations of cross-chain and cyclic compounds, as well as zig-zag-compounds.

The present invention involves an ester not disclosed in the said prior application, but insofar as the reactions are concerned it is an equivalent of the first disclosed ester, and illustrates the same generic invention which is illustrated in said application.

It is the general object of the invention to form condensation products deriving from polyethylene glycol and an ester of a saturated aliphatic monocarboxylic acid with a saturated aliphatic monohydric alcohol.

It is an object of the present invention to condense stearyl stearate with polyethylene glycols.

The polyethylene glycol has the generic formula $HO(CH_2.CH_2.O)_xH$ and the lowest member is diethylene glycol in which $x$ has the value of 2, which has an actual molecular weight of 106. Higher values of $x$ may be used, as well as mixtures of compounds with different values of $x$. These materials and mixtures are comercially available as "Carbowaxes," and are commercially identified either by the exact composition or the average molecular weight. The following are commercially available: diethylene glycol, triethylene glycol, 200, 400, 600, 900, 1,000, 1,500, 4,000 and 6,000. Reference is made to Chemical and Engineering News, volume 23, February 10, 1945, pages 247 to 251, for a publication by C. P. McClelland and R. L. Bateman, entitled "Technology of the polyethylene glycols and Carbowax compounds." This article identifies the polyethylene glycols and the "Carbowaxes" by their commercial designations with their actual or average molecular weight and other properties.

The ester for the present invention is any one or more having the formula $X-O-CO-CH_2-R$ in which X is a saturated aliphatic straight-chain hydrocarbon radical having from 12 to 18 carbon atoms, and in which R is a saturated aliphatic straight-chain hydrocarbon radical having from 10 to 16 carbon atoms. Such esters occur in nature, especially in animal and vegetable fats and oils. They may be made by condensing pure or commercial forms of the corresponding saturated aliphatic straight-chain monohydric alcohols and monocarboxylic acids, each reactant for the ester having from 12 to 18 carbon atoms. The extremes in the resulting range of esters are lauryl laurate and stearyl stearate.

The stearyl stearate may be made by condensing commercial stearyl alcohol with commercial stearic acid. Each of these commercial materials is a variable combination of acids or alcohols, so that on esterification they combine in variable combinations of the several acids and the several alcohols to form various esters other than stearyl stearate.

Commercial stearic acid may be used, varying generally in composition and about as follows:

| | Per cent by weight |
|---|---|
| Lauric acid | 0 to .2 |
| Myristic acid | 0 to 1.8 |
| Palmitic acid | 52 to 64 |
| Stearic acid | 34 to 44 |
| Oleic acid | 2 to 4 |

Using commercial stearyl alcohol and commercial stearic acid, the resulting ester will vary in its melting point as a result of variations in the fatty acid, and as a result of processing conditions in esterifying. However, the general useful properties of the ester, and its activity as a reagent for the present invention, are not significantly altered by such variation in melting point. The stearyl ester of commercial stearic acid, as it has been used in the present invention, has varied from 40° to 44° C. in its melting point.

In carrying out the present invention a stearyl stearate preparation is made a component of an anhydrous mixture with any polyethylene glycol in the ratio of 1 molar quantity of the ester to 1 to 2 molar quantities of the glycol. The mixture is heated, with or without a vehicular non-aqueous solvent which is inert, and the temperature is increased. The water is eliminated by chemical condensation, and the amount of water so eliminated can be used as a control to determine the extent of the reaction. The example may be carried out in numerous ways of which one is herewith given.

Example

Stearyl ester of commercial stearic acid is made using 270 parts by weight of stearyl alcohol and 280 parts of commercial stearic acid. These are condensed by heating in an open vessel for about 7 hours at about 295° C. The formed water is boiled off. To 240 lbs. of the resulting ester is added 330 lbs. of "Carbowax" (MW 1500) and the mixture heated to 275° to 280° C. for 12 hours, with loss of water vapor. This is preferably done in an atmosphere of carbon dioxide, which results in a lighter-colored product. It is believed that considerable oxidation of the compound is thus avoided.

The product is a light tan waxy solid at normal temperature having a melting point of about 40° to 42° C. It is hydrophilic and water dispersible, forming a colloidal solution. It is called self-emulsifying, and is non-ionic. It is an excellent solvent or dispersing agent for DDT, and a valuable emulsifying and dispersing agent in lotions, shaving creams, skin creams, etc.

The reaction is believed to proceed by a mechanism explained on the basis of tautomerism. In the ester, the group —CO—CH< enolizes to

and the resulting —OH group condenses with one mole of polyethylene glycol, while another mole of polyethylene glycol adds on at the unsaturation, thus:

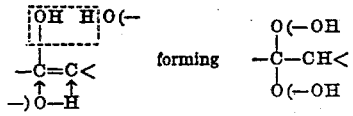

This is one compound of the invention. In the last formula above, the terminal —OH groups also may react like their initial companion terminal —OH groups with another mole of the ester, by the same reaction, making a cyclic compound.

Also said glycolic —OH groups may condense with like —OH groups of a similar compound.

Since any —OH group of a polyethylene glycol or of a compound of such with the ester as above described, may condense with any —OH group of an initial condensation product, or two of the glycolic —OH groups may react with the group —CO—CH as described above, there is a variety of possible end products.

Numerous changes and modifications may be made without departing from the invention as expressed in the appended claims.

I claim:

1. The method comprising heating and condensing with the formation of water one molar quantity of an ester of commercial stearyl alcohol and commercial stearic acid, with 1 to 2 molar quantities of polyethylene glycol, and thereby eliminating by chemical condensation at least one molar quantity of water.

2. The method comprising heating and condensing with the formation of water one molar quantity of stearyl stearate and 1 to 2 molar quantities of polyethylene glycol, and thereby eliminating by chemical condensation at least one molar quantity of water.

3. A condensation product resulting from eliminating water by reaction of stearyl stearate and polyethylene glycol.

4. A condensation product resulting from condensing and eliminating water between an ester of commercial stearyl alcohol and commercial stearic acid, and polyethylene glycol.

5. The method comprising heating and condensing an anhydrous mixture containing polyethylene glycol and ester of the formula $$X—O—CO—CH_2—R$$

in which X and R are saturated aliphatic straight-chain hydrocarbon radicals of which X has from 12 to 18 carbon atoms and R has from 10 to 16 carbon atoms, there being two molar quantities of the ester and from 2 to 4 molar quantities of the polyethylene glycol, and continuing said heating and increasing the temperature as condensation progresses until from 2 to 8 molar quantities of water are formed and removed from the mixture as vapor.

6. A condensation product resulting from condensing and eliminating from 2 to 8 molar quantities of water from an original anhydrous mixture of 2 to 4 molar quantities of polyethylene glycol and 1 to 2 molar quantities of ester having the formula $X—O—CO—CH_2—R$ in which X and R are saturated aliphatic straight-chain hydrocarbon radicals of which X has from 12 to 18 carbon atoms and R has from 10 to 16 carbon atoms.

7. The process which comprises condensing and eliminating water from an anhydrous mixture containing as the predominant and essential reactive ingredients (a) 2 to 4 molar quantities of polyethylene glycol in the form of one or more of the polyethylene glycols and having respectively an actual or average molecular weight in the range from 106 corresponding to diethylene glycol to 6000, and (b) 2 molar quantities of one or more of esters having the formula $$X—O—CO—CH_2—R$$

in which X is a saturated aliphatic straight-chain hydrocarbon radical having from 12 to 18 carbon atoms and in which R is a saturated aliphatic straight-chain hydrocarbon radical having from 10 to 16 carbon atoms, said condensation being effected by heating the mixture to generate and evolve water as vapor and by removal of the water vapor from the reaction mass, until from 2 to 8 molar quantities of water are removed.

LOUIS L. LERNER.

REFERENCES CITED

The following references are of record in the file of this patent:

UNITED STATES PATENTS

| Number | Name | Date |
| --- | --- | --- |
| 1,970,578 | Schoeller et al. | Aug. 21, 1934 |
| 2,185,969 | Schultze | Jan. 2, 1940 |